(No Model.) 2 Sheets—Sheet 1.
A. A. STROM.
RAILROAD FROG.
No. 329,098. Patented Oct. 27, 1885.
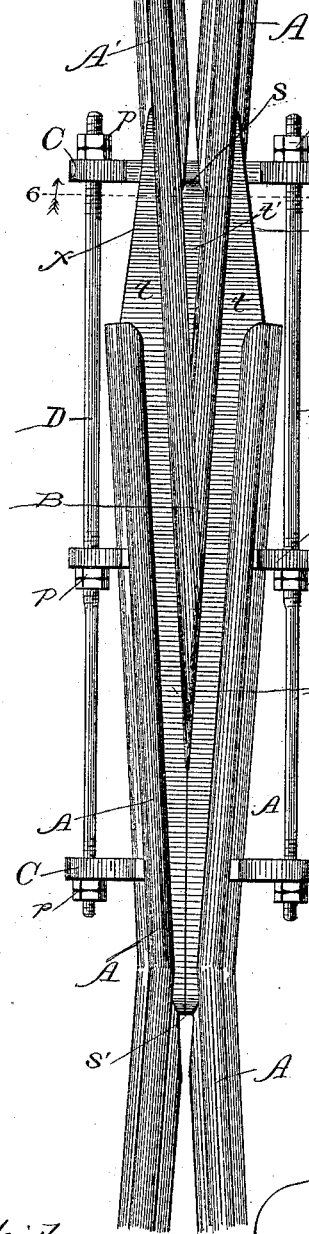
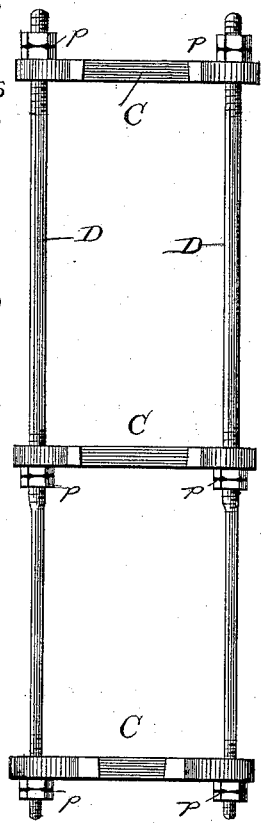
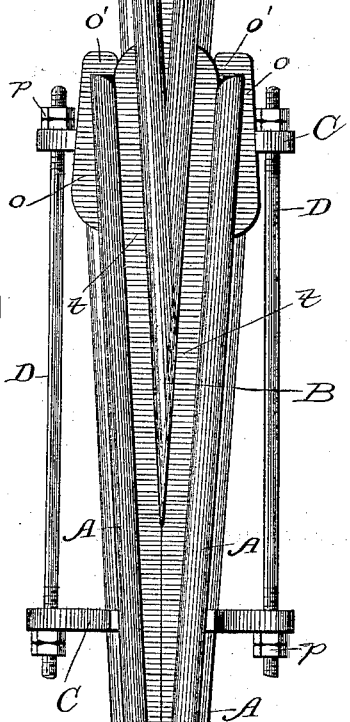
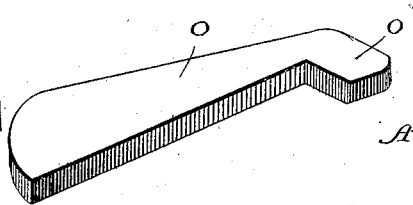
Witnesses:
S. Paré
Mason Bross.
Inventor:
Axel A. Strom,
By Dyrenforth & Dyrenforth,
Attys.

(No Model.) 2 Sheets—Sheet 2.
A. A. STROM.
RAILROAD FROG.
No. 329,098. Patented Oct. 27, 1885.
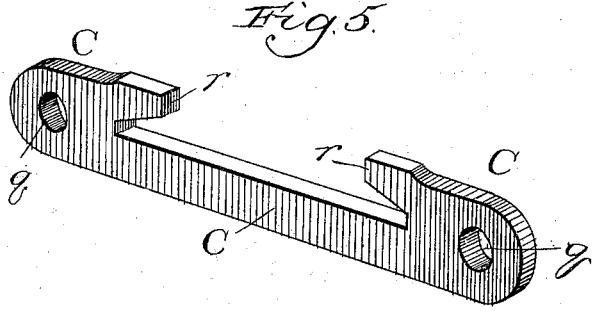
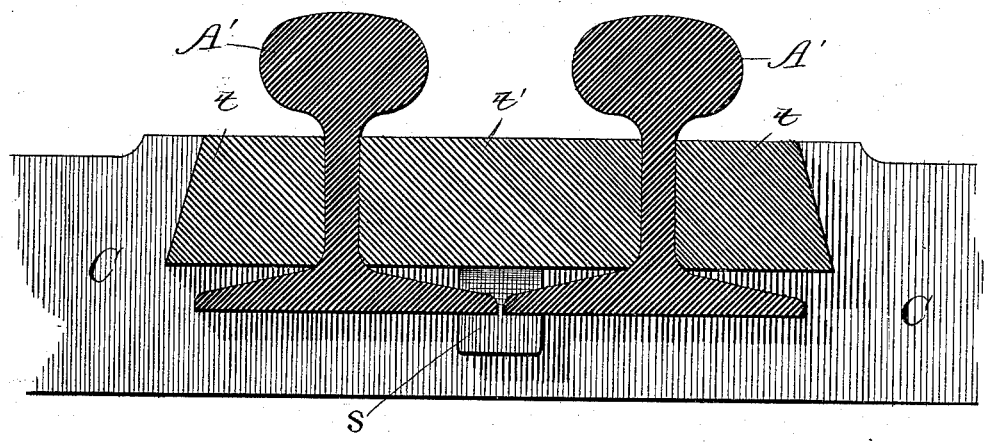
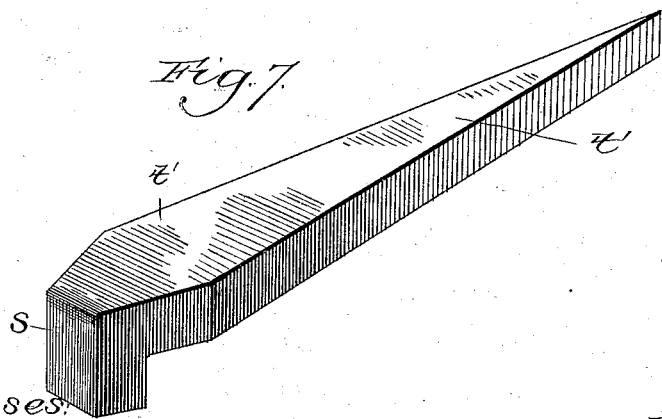
Witnesses:
Inventor:
Axel A. Strom,
By Dyrenforth and Dyrenforth,
Attys.

UNITED STATES PATENT OFFICE.

AXEL A. STROM, OF AUSTIN, ILLINOIS.

RAILROAD-FROG.

SPECIFICATION forming part of Letters Patent No. 329,098, dated October 27, 1885.

Application filed June 23, 1885. Serial No. 169,591. (No model.)

*To all whom it may concern:*

Be it known that I, AXEL A. STROM, a citizen of the United States, residing at Austin, in the county of Cook and State of Illinois, have invented certain new and useful Improvements in Railroad-Frogs; and I hereby declare the following to be a full, clear, and exact description of the same.

My invention relates particularly to means for securing together the rails in a frog device, whereby their separation is prevented without the use of bolts. The undesirability of bolts for the purpose of securing together the rails of a frog device has hitherto been recognized, since they are not only liable to become loosened and even displaced by the pounding and consequent jarring produced by the wheels of the rolling-stock in moving upon the rails, which tendency necessitates the devotion of constant inspection and faithful attention to the parts, but a greater and irremediable objection to the employment of bolts consists in the fact that to accommodate them holes must be provided through the necks of the rails, which are thereby materially weakened, and thus rendered liable to fracture.

To dispense with the use of bolts, clamps have been provided to secure together the rails and filling in frog devices, and the attempt has been made to prevent the displacement of the clamps by means of keys or wedges; but while this form of securing device avoids the employment of bolts and the consequent objection to their use above set forth, it does not afford lasting security of the parts, inasmuch as the pounding upon the rails effects displacement of the clamps, and thus it is just as necessary, if not more so, to avoid accidents with the use of such clamping mechanism, to devote as careful inspection and constant attention to it as it is when bolts are employed in its stead.

It is my object to afford a railroad-frog the parts forming which shall be secured together in a manner to avoid the objections hereinbefore set forth; and to this end my invention consists in clamps, used for the purpose of securing the parts of the frog together, and means for connecting the clamps together, whereby they are also rendered independently adjustable to prevent their accidental displacement.

My invention further consists in details of construction and combinations of parts, all as hereinafter more particularly set forth.

Referring to the drawings, Figure 1 is a plan view of a railroad-frog provided with my improvement; Fig. 2, a similar view of my improved clamping device, showing means for connecting the clamps together; Fig. 3, a similar view to that shown in Fig. 1, representing a modification whereby two clamps are made to serve the purpose of three; Fig. 4, a perspective view of a detail employed in the modification; Fig. 5, a perspective view of a clamp; Fig. 6, a sectional view taken on the line 6 6 of Fig. 1, and viewed in the direction of the arrows, and Fig. 7 a perspective view of a detail forming a part of the filling employed.

A A are the diverging or wing rails, and B is the frog proper, formed by the converging rails A' A'. Plates $t$, forming the filling for the usual purpose, fit against the inner sides of the necks of the rails A and against the adjacent necks of the rails A', and are beveled toward one extremity, as shown at $x$, Fig. 1, for a purpose hereinafter described; and $t'$ is the bar forming the filling between the converging rails which constitute the frog B. The plate $t'$ is bent to form a lug, $s$, as shown in Fig. 7, to project downward between the rails A' and abut against a clamp, hereinafter described, to afford in addition to the clamping mechanism means to prevent displacement of the plate; and the plates $t$ are provided toward one extremity, as indicated at $s'$, Figs. 1 and 3, with lugs to project downward between the rails A, having their flanges cut out at the proper place, as shown, to accommodate the lugs, whereby security in addition to that afforded by the clamping mechanism, as hereinafter described, is provided against the longitudinal displacement of the filling in the direction toward the diverging ends of the rails A adjacent to the frog.

C C are the clamps, comprising each a metal bar provided with inwardly-projecting hooks $r$, and of the necessary length and form to extend transversely across the frog device underneath the same, and cause the hooks $r$ to embrace the flanges of the rails A, as shown toward the lower ends of the illustrations in Figs. 1 and 3, and to press against the beveled edges of the plates $t$, as illustrated toward the upper extremity of Fig. 1. The device, as shown in the first figure of the drawings, is beveled toward its extremities in opposite directions, whereby the movement of each extreme clamp $c$ in one direction is limited.

A tie-rod, D, connects the clamps C together on each side of the device by passing through openings $q$, which, to avoid the necessity of bending the rods, are preferably in line with each other when the clamps are adjusted, and lock-nuts $p$ operate upon threaded portions of the rods to prevent separation from the latter of the clamps and to permit longitudinal independent adjustment of the clamps on the rods. When three clamps are used, as shown in Fig. 1, or more, if the requirement of additional strength shall render more than three clamps desirable, the rods may present unequal diameters in different portions of their lengths to avoid threading them throughout their entire lengths, or at least a large part thereof, when, of course, nuts of different sizes, to correspond with the varying diameters of the rods, must be used.

It will be seen from the foregoing construction that no pounding or strain upon the rails can displace the clamps or any part of the frog device, since any cause that would tend to move one extreme clamp in a direction to effect loosening of the parts of the device would tend to draw the clamp at the opposite extreme in the same direction, and the clamps would either remain stationary or, if by accident one were not to fit with absolute firmness, slight movement of the other, owing to the connection of all, would effect tightening of it, and the slight spreading of the rails adjacent to the first-named clamp would produce no serious consequences.

If it is desired to employ two clamps only instead of three or more, this may be done by means of the construction shown in Fig. 3 of the drawings, wherein plates $o$ are provided having beveled external edges, and bent toward one extremity to produce lugs $o'$. These lugs afford stops to the ends of the diverging rails A, and the clamps C operate against the beveled edges of the plates in a manner similar to their operation against the beveled edges of the plates $t$, forming filling, as shown in Fig. 1.

If desired, my invention could be used with the keys or wedges, hereinbefore referred to, which would operate like the beveled edges I provide, and a secure device would be afforded by connecting together and rendering independently adjustable the clamps provided with such wedges or keys.

It is not only in connection with frog devices for railroads that the principle of my invention—viz., connecting together the clamps operating to prevent separation of the parts—may be employed as it will serve equally well in securing rails together in other connections, and I have invented a particular device involving this principle, (and for which I intend to make application for Letters Patent,) to effect the usual purpose of a fish-plate in joining the ends of rails.

What I claim as new, and desire to secure by Letters Patent, is—

1. A railroad-frog having its parts secured together by connected clamps independently adjustable longitudinally upon their connecting medium, substantially as described.

2. A railroad-frog having its parts secured together by connected clamps, independently adjustable longitudinally upon their connecting medium, embracing opposing beveled surfaces, substantially as described.

3. A railroad-frog comprising diverging rails A and converging rails A', plates $t$, forming filling and having their outer edges beveled toward one extremity, which extends beyond the diverging ends of the rails A, a plate, $t'$, forming filling, the rails A', clamps C, to secure the parts of the frog together, and means, substantially as described, connecting the clamps, the whole being constructed and arranged to operate as and for the purpose set forth.

4. A railroad-frog comprising diverging rails A and converging rails A', plates $t$, forming filling and having their outer edges beveled toward one extremity, which extends beyond the diverging ends of the rails A, a plate, $t'$, forming filling between the rails A', clamps C, to secure the parts of the frog together, and tie-rods D, connecting the clamps and provided with lock-nuts $p$, the whole being constructed and arranged to operate substantially as described.

5. A railroad-frog comprising diverging rails A and converging rails A', plates $t$, forming filling and provided toward one extremity with lugs $s$, projecting between the adjacent flanges of the rails A, and having their outer edges beveled toward their opposite extremity which extends beyond the diverging ends of the rails A, a plate, $t'$, forming filling and provided toward one extremity with a lug, $s$, projecting between the flanges of the rails A', clamps C, to secure the parts of the frog together, and tie-rods D, connecting the clamps and provided with lock-nuts $p$, the whole being constructed and arranged to operate substantially as described.

AXEL A. STROM.

In presence of—
  A. G. PETTIBONE,
  A. H. MULLIKEN.